3,661,836
METAL-CONTAINING POLYACYLOX-ALAMIDRAZONES

Albert Schopf, Hering, Michael Wallrabenstein, Hans-Dieter Rupp, and Helmut Magerlein, Erlenbach, Heinz Grotjahn, Rollfeld, and Gerhard Meyer, Obernburg, Germany, assignors to Glanzstoff AG, Wuppertal, Germany
No Drawing. Filed Apr. 27, 1970, Ser. No. 32,393
Claims priority, application Germany, May 2, 1969,
P 19 22 334.8
Int. Cl. C08g 33/04, 51/04; C08k 1/06
U.S. Cl. 260—37 N          10 Claims

ABSTRACT OF THE DISCLOSURE

A metal-containing polyacyloxalamidrazone in which the metal is chemically bound to the polymer to provide a heat-resistant colored composition useful as a pigment or a supported metal catalyst.

---

Many so-called organic pigments are known including those having a polymeric structure, e.g. as obtained with various vinyl polymers. However, such organic pigments do not necessarily have good fastness properties and are often unstable at elevated temperatures so that they are limited in their technical applications.

One object of the present invention is to provide a colored composition of matter capable of being used as a highly heat-resistant pigment. Another object of the invention is to provide a polymeric substance chemically bound to a relatively large amount of one or more metals in order to obtain useful metallic compounds or compositions which are not only colored but which are also capable of being used as metal-containing catalysts. Other objects and advantages of the invention will become more apparent upon consideration of the following detailed description.

It has now been found, in accordance with the invention, that a heat-resistant colored polymeric composition is achieved with a polyacyloxalamidrazone which contains in chemically bound form at least one metal of Groups IIa, IIIa, IVa, Va, VIa, VIIa, VIII, Ib, IIb, IIIb, IVb or Vb of the long periodic system of elements. These metals are all taken up by the polyacyloxalamidrazone in an amount sufficient to impart a visible or distinct coloration of the generally colorless polymer, even when using very small amounts of the metal of only about 0.01% by weight, with reference to the polymer. In general, it is preferable to provide a metal content of at least approximately 0.1% by weight up to the saturation point of the particular polymer. This "saturation point" is defined herein as the maximum amount of the metal capable of being chemically bound to the polymer or, as a practical matter, the maximum amount of metal taken up by the polymer when contacted with a solution of the metal over a prolonged period of time, e.g. several days.

The polymer to be colored in accordance with the invention is a polyacyloxalamidrazone which is characterized by recurring units of the formula:

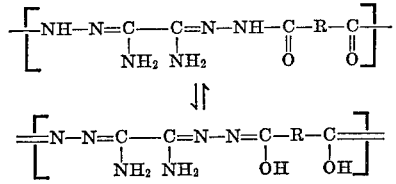

in which R represents a divalent organic radical, especially one consisting essentially of a hydrocarbon structure of 2 to 12 carbon atoms, e.g. a straight chain or branched chain saturated or unsaturated aliphatic radical which preferably contains 2 to 6 carbon atoms, or a cycloaliphatic, araliphatic, aromatic or heterocyclic radical which preferably contains 6 to 12 carbon atoms.

Polyterephthaloyloxalamidrazone and polyfumaroyloxalamidrazone are especially preferred for purposes of the present invention, i.e. wherein R represents the paraphenyl radical or the —CH=CH— radical. Such polymers can contain two or more different radicals R by employing a mixture of dicarboxylic acid halides in their initial preparation. Other suitable acyl radicals, by way of example, include those which are derived from isophthalic acid, 2,6-naphthalene dicarboxylic acid, adipic acid and sebacic acid.

Polyacyloxalamidrazones of this type are well known polymers which have been described in detail in the prior art, for example, in Luxembourg Pats. Nos. 54,747 and 57,177. The polymers are obtainable by reacting oxalic acid bisamidrazone with one or more dicarboxylic acids of the formula:

X—CO—R—CO—X in which R has the same meaning as set forth above, and X represents chlorine or bromine.

Polyacyloxalamidrazones are generally obtained by known methods in a wide range of molecular weights, e.g. as polymers which have a reduced viscosity of approximately 0.2 to 5.4. However, the polyacyloxalamidrazone may also be obtained with still higher molecular weights as set forth in copending application Ser. No. 716,364, filed Mar. 27, 1968. Accordingly, the polymers of the present invention include those in which very high molecular weights are achieved, e.g. up to a value of about 7 for the reduced viscosity (measured as a 1% by weight solution of the polymer in a 10% KOH aqueous solution at 30° C.)

The metal component of the polymeric compounds or compositions according to the invention is present in a chemically bound form, i.e. in a complex form such as an enolate. Although the exact nature of the complex combination of the metal with the polymer cannot be fully established, it can be assumed that the complexing takes place through the carbonyl oxygen atoms and/or other active sites on the polymer molecule. This is clearly evidenced by the strong covalent type of bonding achieved rather than a relatively weak ionic bonding. The proportion of metal combined with the polymer can range from very small quantities, e.g. about 0.1% by weight, up to the saturation limit, but in most cases a proportion of about 50% by weight represents the preferred maximum content of the metal.

The colored products according to the invention may contain only one metal in complex combination with the polymer, but the invention also includes polyacyloxalamidrazones containing two or more metals. These colored products do not sinter and do not even soften to any appreciable extent. According, they are dimensionally stable on heating and very difficult to destroy by heat.

The color of the polymer will vary according to the particular metal or metals contained therein, and even with a relatively small metal content, the color is quite intense so that additional coloring of the polymer is unnecessary. However, the materials may be additionally colored with the usual dyes such as disperse dyes, metal complex dyes, substantive dyes and basic or acid dyes. Other conventional additives such as pigments, fillers or the like may also be used but are generally unnecessary.

The metal-containing polyterephthaloyloxalamidrazone product, by way of example, can exhibit the following colors with reference to individual metals:

Black: Ni, Co, Ag and Cu;
Orange to Brown: Ti, Zn, Sn, Pb, Zr, W, Mo, Pt, Cd, Ca, Ba and Sr;
Red: Bi and Sb;
Yellow-orange: Ta and Zr;
Yellow: Ga and Nb; and
Dark Blue: Fe.

By using appropriate combinations of two or more metals having a different coloring effect, it is possible to achieve a wide variation in color, tone and/or shade. The foregoing metals, listed by their coloring effect, are considered to be especially suitable, tantalum being preferred over zirconium for the yellow-orange color.

When in a very finely divided form, the products according to the invention are relatively heat-stable or heat-resistant pigments which can be used in a large variety of technological applications. In this respect, it is desirable to reduce the polymer to conventional pigment sizes which for many applications should be on the order of magnitude of about 0.1 to 1 micron. However, a wide range of particle sizes are suitable for such pigments and the term "pigmentary particle size" refers to those sizes conventionally observed for all types of commercial pigments. The pigments can be added to all types of solvent mediums, e.g. in the preparation of paints, lacquers, enamels, pastes or the like, usually with the addition of conventional dispersing or emulsifying agents to achieve a uniform mixture. Also, the pigments are particularly useful for the internal pigmentation of other synthetic thermoplastic or thermosetting polymers. Because of their heat-resistance, the pigments of the invention are especially adapted to act as a coloring additive for those materials which are subsequently subjected to heat at relatively high temperatures.

Moreover, the substances according to the invention, represent valuable metal compounds or compositions which can be used wherever it is desired to avoid the use of the corresponding metals as low molecular weight compounds, e.g. because of their solubility, or in those instances where it is impractical to use the pure metal alone. This often occurs in catalytic processes. Therefore, by reason of their good heat stability and relatively high content of typical catalytic metals, the products of the present invention can be prepared in a variety of shapes and sizes suitable for use in conventional catalyst beds, including both fixed and fluidized beds. With fine particle sizes, suspension catalysts are also practical. For these purposes, it is preferable to fully saturate the polymer with the metal so as to provide a high metal content, e.g. on the order of 10 to 50% by weight, preferably 20 to 50% by weight. The color of the catalyst is often of advantage. Moreover, the polymer itself as well as the metal-containing polymer is highly insoluble in many common solvents including water and organic solvents, even at high temperatures, so that the catalytic particles are easily added and removed and may even be regenerated while remaining quite stable under normal operating conditions of many catalytic reactions.

The present invention further includes a suitable process for the production of the metal-containing polymer which requires the reaction of the polyacyloxalamidrazones in finely distributed form with a solution of at least one solvent-soluble metal compound.

The polyacyloxalamidrazone may be present in solid form, for example as a powder or granulate, and may be treated or contacted in this form with a liquid solvent solution of one or more of the metal compounds in an immersion or impregnating bath. Alternatively, the solution of the metal compound may be sprayed onto the solid particles of polyacyloxalamidrazone, or the finely distributed polyacyloxalamidrazone may be brought into the reaction in the form of a basic aqueous solution, for example in a dilute aqueous alkali metal hydroxide solution.

The reaction rate and the quantity of metal taken up by the polymer depends on several factors. In general, this reaction rate depends in part on the particular polyacyloxalamidrazone chosen, the particular metal, the metal compound, the concentration of the treatment bath, the temperature of the immersion bath, the solvent or solvent mixture, the pH of the solution and the particle size of the polymer. The most suitable conditions for preparing a particular polyacyloxalamidrazone metal compound can be easily determined by a routine series of preliminary tests, and such conditions are further illustrated by the accompanying examples. A very wide range of conditions are possible if only small amounts of the metal are to be taken up and/or if relatively long treatment periods are acceptable.

Metal compounds which are suitable for use in the reaction of the invention include substantially all inorganic and organic compounds and also complex compounds of the metals, provided that they exhibit reasonably good solubility in at least one aqueous or organic solvent as the contacting liquid. Inorganic metal compounds include a wide variety of salts such as halides, e.g. bromides, iodides and especially chlorides, and also sulfates and nitrates. Oxides and hydroxides may also be used with advantage. Organic metal salts are likewise quite suitable and even complex organo-metallic compounds such as acetyl-acetonates or the like. Such solvent-soluble metal compounds need not be neutral-reacting but can also be acid- or basic-reacting since the pH of the solution is relatively uncritical.

For the reaction with polyacyloxalamidrazone, it is thus possible to use solutions of these many different metal compounds in any suitable solvent such as water, including alkaline or acidic aqueous solutions and any number of organic solvents, including for example: alkanols such as methanol or ethanol, dimethyl sulfoxide, hexamethyl phosphoric acid triamide, sulfolane (tetrahydrothiophene-1,1-dioxide), tetramethylurea, dimethyl formamide, pyridine and other amines. In some cases, chlorinated hydrocarbons, esters, and ketones are also quite suitable, and carbon disulfide may also be used. Mixtures of different solvents are sometimes advantageous, e.g. to achieve the highest concentration of a mixture of dissolved metals.

In general, the solvent is desirably selected together with the novel compound in order to achieve a relatively easy dissolution of the metal into the liquid solvent. Good results are achieved even with relatively low concentrations of the metal compound in the solvent, e.g. as low as 0.5–1% by weight. Most often, it is convenient to work at higher concentrations, e.g. up to 20–25% by weight or more, depending upon the saturation limit in the solvent. Where treating finely dispersed solid particles of the polymer or alkaline polymer solutions, the reaction mixture or liquid bath can be constantly stirred with the initial addition of an excess of the metal compound or else with a subsequent step-wise or continuous addition of the metal compound as it is being taken up by the polymer from the solution.

Although water is particularly convenient and economical as the solvent, dilute alkaline aqueous solutions are especially advantageous. Water can then be used to wash the final product free of adherent ions or other impurities, whereas treatment with an organic solvent containing the dissolved metal compound often requires washing with the same or a similar organic solvent and this becomes relatively more expensive. After washing, the metallized polymer product can be slowly air dried or rapidly dried at elevated temperatures.

The reaction or contact treatment of the polymer with the solution is advantageously carried out at room temperature and atmospheric pressure. Higher temperatures up to the boiling point of the solvent or even higher under elevated pressures may be used if desired. The concentration of the metal compound in the solution medium may be varied from very low concentrations up to saturation limit of the particular solvent for the metal compound. It is advantageous to employ relatively concentrated solutions, if only to reduce the total period of time required to take up the metal onto the polymer.

The following examples will serve to further illustrate the invention.

EXAMPLES 1-32

The metal-containing polymers according to the invention were prepared as follows:

Pulverulent polyacyloxalamidrazone is introduced with stirring into any suitable vessel containing the solvent in which the metal compound is dissolved, and the contents of the vessel are continuously stirred at room temperature and normal pressure.

At the end of the desired reaction or treatment time, the resulting metal-containing polyacyloxalamidrazone is filtered off and washed several times with water or, if desired, with the organic solvent in which the metal compound had been dissolved, until the washings are free from ions. The reaction product is then washed twice with acetone and dried for about 24 hours at 70 to 80° C. Experimental conditions and results are summarized in the following table.

dimethyl formamide and water, and then dried. The reaction product contained 11.8% by weight of bismuth and 0.2% by weight of zinc.

Similar results are achieved with other polyacyloxalamidrazones as well as other individual metals and combinations of metals so as to obtain useful pigments with a wide variation in color and also useful supported metal catalysts. When employed for these purposes, e.g. by addition of the pigments before or during extrusion of other colorless thermoplastic polymers, the desired color is maintained and there is no damage to the heat-resistant pigment. The dimensional stability of the metallized products is also quite good over a wide variety and range of conditions.

The invention is hereby claimed as follows:

1. A colored polymeric composition as prepared by the process of claim 7 comprising a polyacyloxalamidrazone having recurring units of the formula

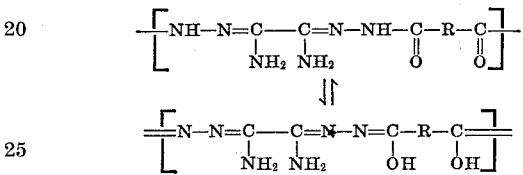

TABLE

| Example | Polyacyloxalamidrazone | Metal compound | Solvent | Conc., percent by weight | Time, hours | Quantity of metal taken up, percent by weight | Colour of reaction product |
|---|---|---|---|---|---|---|---|
| 1 | Polyterephthaloyloxalamidrazone | Pb(NO$_3$)$_2$ | Water | 10 | 48 | 29.4 | Red brown. |
| 2 | do | Pb(NO$_3$)$_2$ | do | 10 | 64 | 41.5 | Do. |
| 3 | do | SnCl·2H$_2$O | do | 25 | 48 | 34.5 | Orange. |
| 4 | do | TlSO$_4$ | do | 5 | 48 | 10.5 | Yellow. |
| 5 | do | LaCl$_3$·H$_2$O | do | 5 | 72 | 2.2 | Do. |
| 6 | do | CeCl$_3$·7H$_2$O | do | 5 | 72 | 3.0 | Olive green. |
| 7 | do | CuCl$_2$·5H$_2$O | 2n·NH$_4$OH | 10 | 48 | 9.8 | Black. |
| 8 | do | 3CdSO$_4$·8H$_2$O | 2n·NH$_4$OH | 20 | 48 | 29.4 | Brown. |
| 9 | do | 3CdSO$_4$·8H$_2$O | 2n·NH$_4$OH | 20 | 72 | 49.0 | Do. |
| 10 | do | ZnCl$_2$ | 2n·NH·OH | 10 | 48 | 21.5 | Cognac-brown. |
| 11 | do | ZnCl$_2$ | 2n·NH$_4$OH | 20 | 64 | 36.2 | Do. |
| 12 | do | MnCl$_2$·4H$_2$O | 2n·NH$_4$OH | 10 | 24 | 11.0 | Black-brown. |
| 13 | do | NiSO$_4$·7H$_2$O | 2n·NH$_4$OH | 20 | 28 | 13.6 | Black. |
| 14 | do | Ba(OH)$_2$ | Water | (¹) | 24 | 15.5 | Brown. |
| 15 | do | CaCl$_2$ | 2n·NH$_4$OH | 10 | 24 | 12.0 | Do. |
| 16 | do | BiCl$_3$ | DMF | 10 | 24 | 44.0 | Wine red. |
| 17 | do | SbCl$_3$ | DMF | 5 | 48 | 9.7 | Red. |
| 18 | do | ZrCl$_4$ | DMF | 5 | 48 | 9.0 | Ochre. |
| 19 | do | PbCl$_2$ | DMF | 1 | 48 | 9.0 | Pale brown. |
| 20 | do | SnCl$_2$ | Ethanol | 5 | 24 | 16.2 | Orange. |
| 21 | do | WCl$_6$ | do | 5 | 48 | 8.5 | Brown. |
| 22 | do | NbCl$_5$ | CCl$_4$ | 5 | 48 | 21.5 | Yellow. |
| 23 | Polyfumaroyloxalamidrazone | ZnCl$_2$ | 2n·NH$_4$OH | 10 | 24 | 21.7 | Brown. |
| 24 | do | 3CdSO$_4$·8H$_2$O | 2n·NH$_4$OH | 10 | 24 | 27.5 | Do. |
| 25 | do | Pb(NO$_3$)$_2$ | Water | 10 | 24 | 16 | Red brown. |
| 26 | Poly-2,6-naphthaloyloxalamidrazone | ZnCl$_2$ | 2n·NH$_4$OH | 10 | 24 | 18.5 | Brown. |
| 27 | do | 3CdSO·8H$_2$O | 2n·NH$_4$OH | 10 | 24 | 22 | Do. |
| 28 | do | Pb(NO$_3$)$_2$ | Water | 10 | 24 | 12 | Red brown. |
| 29 | Polyisophthaloyloxalamidrazone | ZnCl$_2$ | 2n·NH$_4$OH | 10 | 24 | 14.4 | Brown. |
| 30 | do | 3CdSO$_4$·8H$_2$O | 2n·NH$_4$OH | 10 | 24 | 19.2 | Do. |
| 31 | do | Pb(NO$_3$)$_2$ | Water | 10 | 24 | 15.5 | Red brown. |
| 32 | Polyterephthaloyloxalamidrazone | Fe-acetyl-acetonate | DMF | 5 | 64 | 2.4 | Dark blue. |

¹ Saturated.

NOTE.—"DMF" in the foregoing table stands for dimethylformamide.

EXAMPLE 33

Pulverulent polyterephthaloyloxalamidrazone was introduced with stirring into an ethanolic solution of 0.02 mol of copper chloride and 0.02 mol of antimony chloride and mixed. The reaction mixture was then left to stand at room temperature for 48 hours. The resulting metal-containing polyterephthaloyloxalamidrazone was then filtered off, washed several times with ethanol and then dried. The polymer product contained 3.15% by weight of antimony and 4.35% by weight of copper.

EXAMPLE 34

Pulverulent polyterephthaloyloxalamidrazone was introduced with stirring into a solution consisting of equal parts of a 0.4 molar solution of bismuth chloride in dimethyl formamide, and a 0.4 molar solution of zinc chloride in dimethyl formamide and mixed. After the reaction mixture had been left to stand at room temperature for 48 hours, the resulting metal-containing polyterephthaloyl-oxalamidrazone was filtered off, washed several times with wherein R is a divalent organic radical of from 2 to 12 carbon atoms, said polyacyloxalamidrazone being in complex chemical combination with at least one metal selected from the class consisting of the metals of Groups IIa, IIIa, IVa, Va, VIa, VIIa, VIII, Ib, IIb, IIIb, IVb and Vb of the long periodic system of elements.

2. A composition as claimed in claim 1 wherein the polyacyloxalamidrazone has a metal content of approximately 0.1 to 50% by weight.

3. A composition as claimed in claim 1 wherein said polyacyloxalamidrazone is selected from the class consisting of polyterephthaloyloxalamidrazone and polyfumaroyloxalamidrazone.

4. A composition as claimed in claim 3 wherein the polyacyloxalamidrazone has a metal content of approximately 0.1 to 50% by weight.

5. A composition as claimed in claim 1 wherein said at least one metal is selected from the class consisting of nickel, cobalt, silver, copper, titanium, zinc, tin, lead, zirconium, tungsten, molybdenum, platinum, cadmium, calcium, barium, strontium, bismuth, antimony, tantalum, gallium, niobium and iron.

6. A composition as claimed in claim 1 in which the metal-containing polyacyloxalamidrazone is a finely divided solid having a pigmentary particle size.

7. A process for the production of a colored metal-containing polyacyloxalamidrazone which comprises contacting a finely divided or dissolved polyacyloxalamidrazone with a liquid solvent containing dissolved therein at least one metal compound soluble in said solvent, the metal being selected from the class consisting of the metals of Groups IIa, IIIa, IVa, Va, VIa, VIIa, VIII, Ib, IIb, IIIb, IVb and Vb of the long periodic system of elements, for a period of time sufficient to develop a coloration of the polyacyloxalamidrazone.

8. A process as claimed in claim 7 wherein the polyacyloxalamidrazone is treated as a finely divided solid having a pigmentary particle size.

9. A process as claimed in claim 7 wherein the polyacyloxalamidrazone is treated while dissolved and distributed in a basic aqueous solution.

10. A process as claimed in claim 7 wherein said metal is selected from the class consisting of nickel, cobalt, silver, copper, titanium, zinc, tin, lead, zirconium, tungsten, molybdenum, platinum, cadmium, calcium, barium, strontium, bismuth, antimony, tantalum, gallium, niobium and iron.

References Cited

UNITED STATES PATENTS

| | | | |
|---|---|---|---|
| 3,215,663 | 11/1965 | Weisberg | 260—37 N UX |
| 3,255,148 | 6/1966 | Sievenpiper et al. | 260—37 N |
| 3,280,053 | 10/1966 | Twilley et al. | 260—37 N X |
| 3,368,992 | 2/1968 | Altermatt | 260—37 N X |
| 3,376,267 | 4/1968 | Pruckmayr | 260—78 |
| 3,458,470 | 7/1969 | Edgar | 260—37 N |
| 3,544,528 | 12/1970 | Magerlein et al. | 260—78 |

FOREIGN PATENTS

| | | | |
|---|---|---|---|
| 1,139,279 | 1/1969 | Great Britain | 260—78 |

OTHER REFERENCES

Polyamide Resins, Floyd, 1966, pp. 72–78.

HOWARD E. SCHAIN, Primary Examiner

U.S. Cl. X.R.

260—78 TF